United States Patent
Aderhold et al.

(10) Patent No.: US 7,147,892 B2
(45) Date of Patent: *Dec. 12, 2006

(54) MONOLITH COATING APPARATUS AND METHOD THEREFOR

(75) Inventors: Dirk Aderhold, Herts (GB); Alan George Haynes, Herts (GB); Michael Leonard William Spencer, Herts (GB); Duncan John William Winterborn, Milton (GB)

(73) Assignee: Johnson Matthey Public Limited Company, London (GB)

( * ) Notice: Subject to any disclaimer, the term of this patent is extended or adjusted under 35 U.S.C. 154(b) by 359 days.

This patent is subject to a terminal disclaimer.

(21) Appl. No.: 10/628,543

(22) Filed: Jul. 28, 2003

(65) Prior Publication Data

US 2004/0023799 A1    Feb. 5, 2004

Related U.S. Application Data

(63) Continuation of application No. 09/646,064, filed as application No. PCT/GB99/00652 on Mar. 5, 1999, now Pat. No. 6,599,570.

(30) Foreign Application Priority Data

Mar. 19, 1998    (GB) ................... 9805815.9

(51) Int. Cl.
*B05D 1/30* (2006.01)
(52) U.S. Cl. ...................... 427/238; 264/101
(58) Field of Classification Search ............... 427/238; 118/50; 264/101; 210/406; 502/439
See application file for complete search history.

(56) References Cited

U.S. PATENT DOCUMENTS

| 4,191,126 A | 3/1980 | Reed et al. |
| 4,384,014 A | 5/1983 | Young |
| 4,931,419 A | 6/1990 | Blanchard et al. |
| 5,077,093 A | 12/1991 | Baumgartner et al. |
| 5,246,457 A | 9/1993 | Piez et al. |
| 5,422,138 A | 6/1995 | Watanabe et al. |
| 5,543,181 A | 8/1996 | Fehn et al. |
| 6,599,570 B1 * | 7/2003 | Aderhold et al. ........... 427/238 |

FOREIGN PATENT DOCUMENTS

| EP | 0 157 651 A2 | 10/1985 |
| EP | 0 202 733 A2 | 11/1986 |
| EP | 0 398 128 A1 | 11/1990 |
| GB | 2 012 616 A | 8/1979 |
| JP | 60-12136 | 1/1985 |
| JP | 60 012136 | 1/1985 |
| WO | WO-97/26226 | 7/1997 |
| WO | WO-97/48500 | 12/1997 |

OTHER PUBLICATIONS

British Search Report from UK Application No. 9805815.9, dated Jun. 10, 1998.
International Search Report from International Application No. PCT/GB99/00652, dated Jun. 18, 1999.

* cited by examiner

*Primary Examiner*—Stuart Hendrickson
(74) *Attorney, Agent, or Firm*—RatnerPrestia

(57) ABSTRACT

Apparatus for coating a support such as a monolithic catalyst support (5) comprises a dispenser (1) for dispensing a predetermined quantity of coating liquid, a containment (2) for the liquid and a source of vacuum (8, 9) which can be actuated to draw the entire quantity of coating liquid into the support (5). The apparatus and method are particularly useful for coating car catalysts without wastage and with increased design options.

21 Claims, 3 Drawing Sheets

Figure 1:
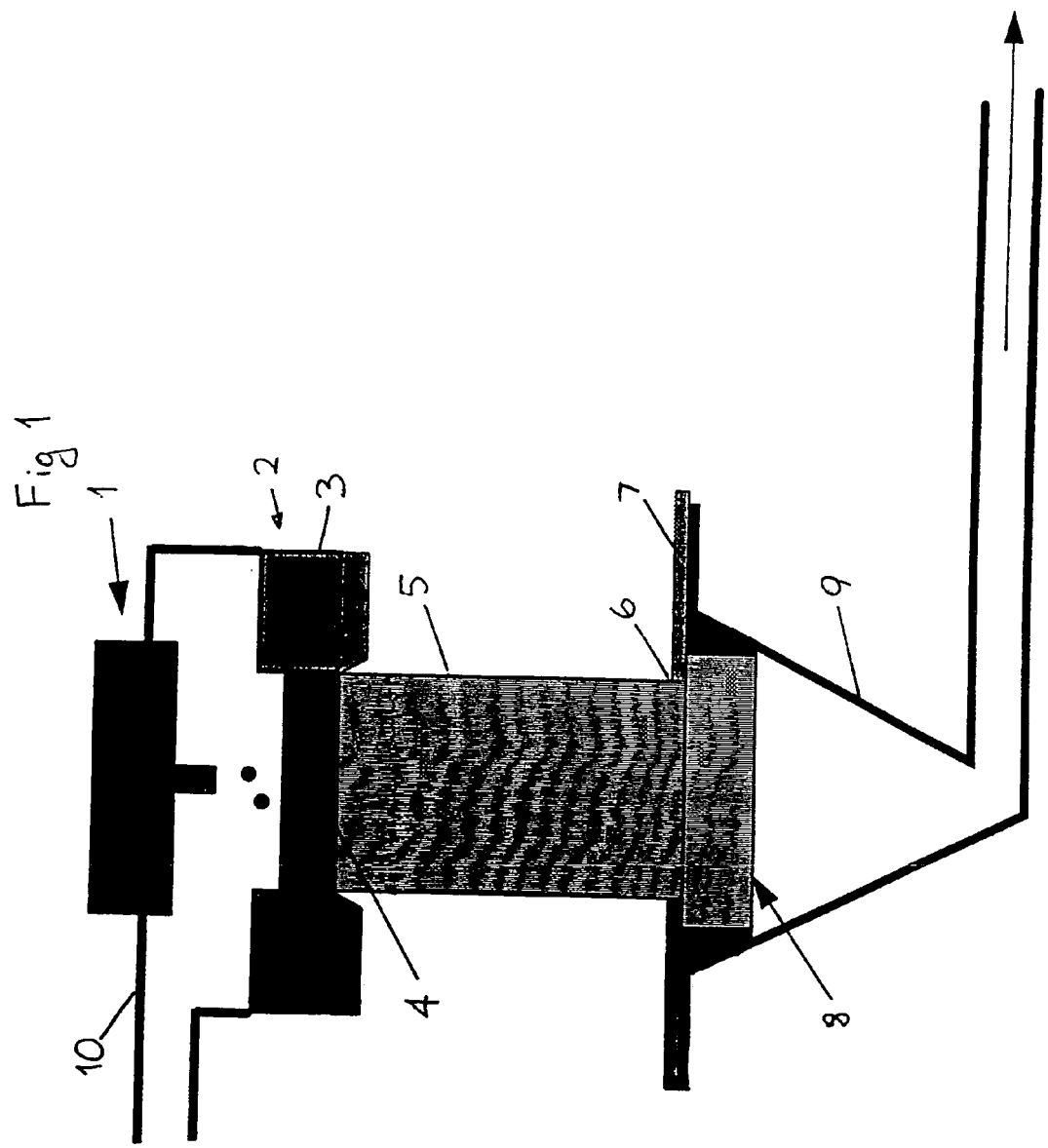

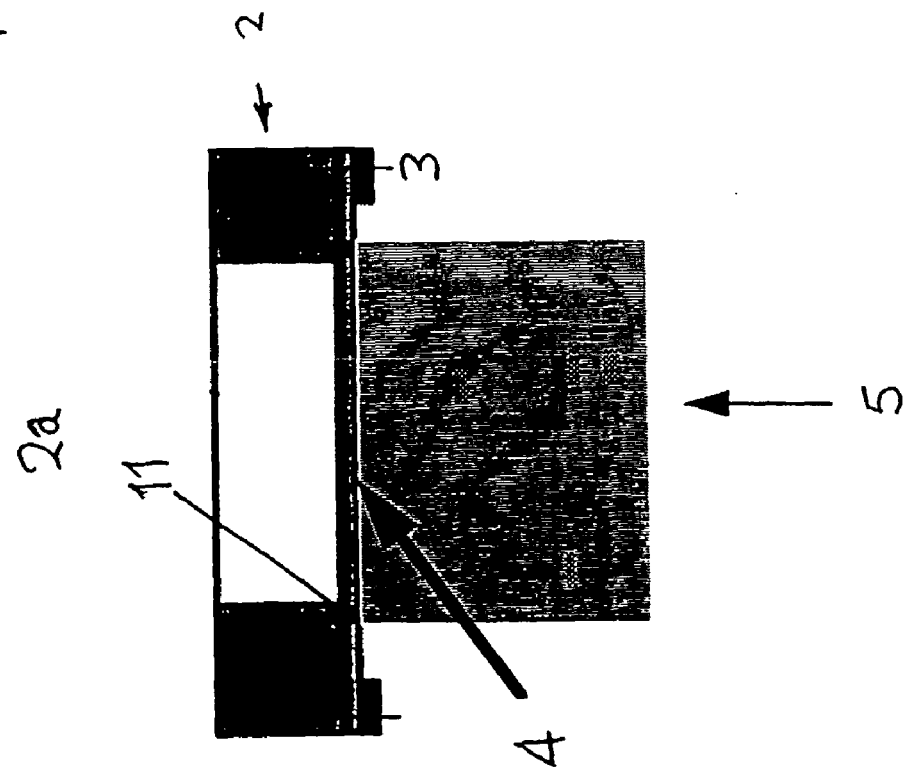
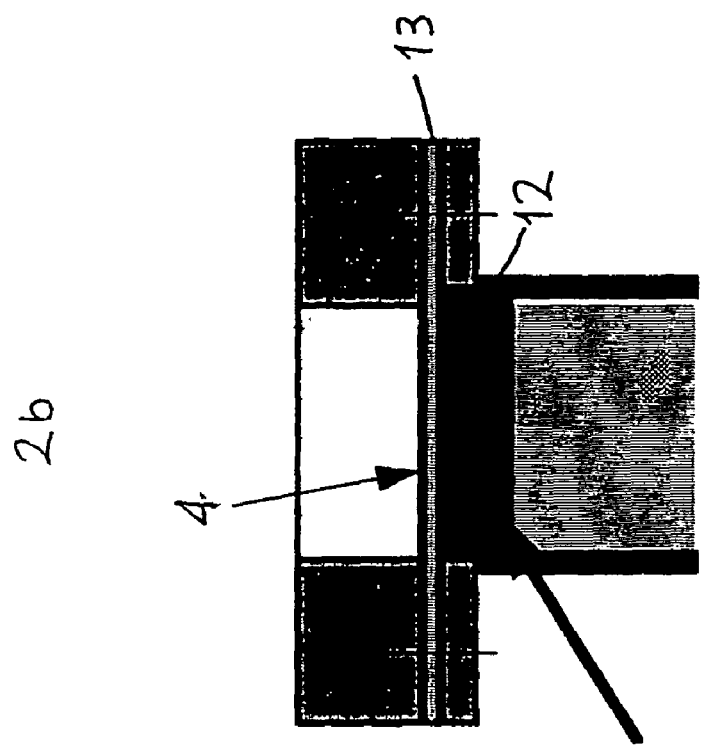
Fig 2

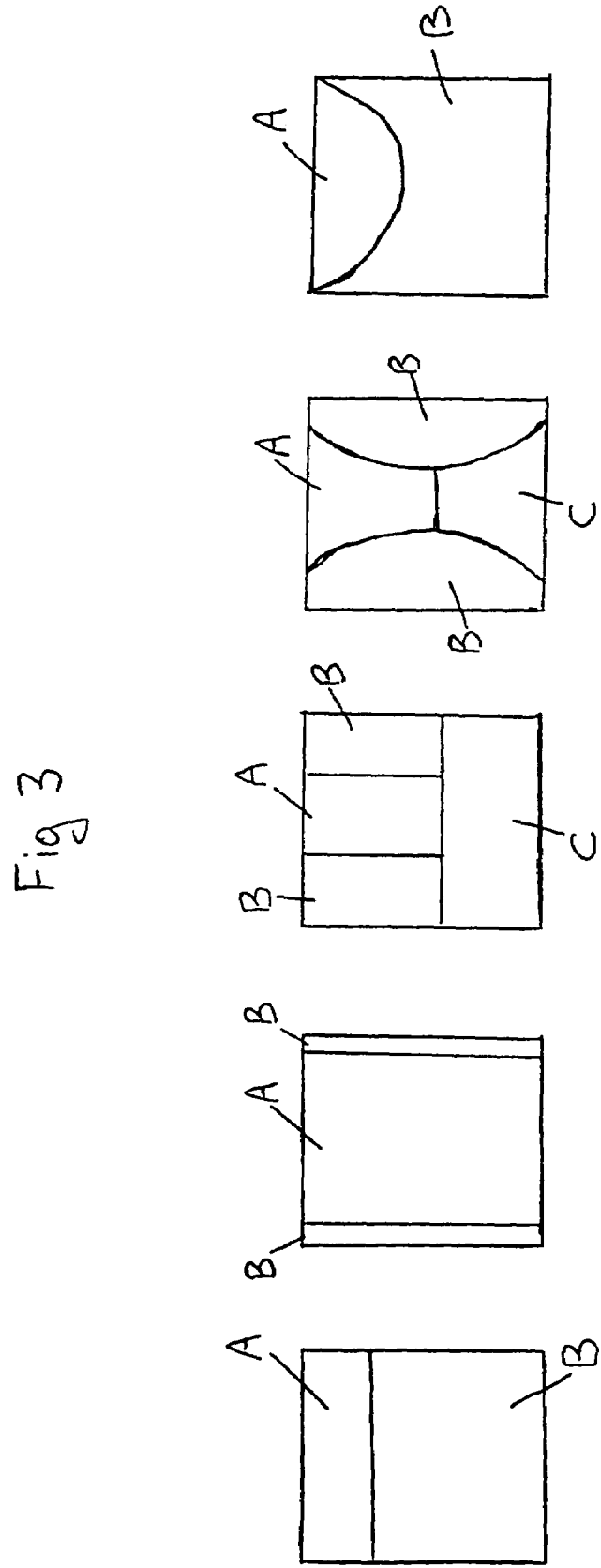

MONOLITH COATING APPARATUS AND METHOD THEREFOR

This application is a continuation of U.S. patent application No. 09/646,064, filed Oct. 27, 2000 now U.S. Pat. No. 6,599,570, which is the U.S. national-phase application of International Application No. PCT/GB99/00652 filed Mar. 5, 1999.

The present invention concerns improvements in a manufacturing process, and more especially concerns apparatus and methods suitable for the manufacture of catalysts supported on monolithic supports and like products.

Large numbers of catalysts supported on high surface area monolithic supports are manufactured each year. One of the principal types of such catalyst is the catalytic convertor for the internal combustion engine, and the present invention has particular utility in relation to these. For conciseness, the following description will particularly describe the use of the invention for car catalysts, but it should be understood that the invention may find application in all similar types of catalyst, whether for vehicles ("car catalysts" is intended to include trucks, utility vehicles, buses, motorcycles etc), ships, stationary power sources or gas clean-up from other industrial processes. The present invention is also useful in the manufacturing of like products where a coating is applied to a carrier, and we mention particularly absorber/desorber coatings, many of which are used in exhaust emission control. Such products are not technically "catalysts". We would mention particularly NOx absorbers, hydrocarbon absorbers, absorbers for sulphur compounds, and water vapour absorbers. As well as absorbers for gas treatment, absorbers may find use in heat pumps, eg air conditioning coolers.

The car catalyst is generally supported on an extruded ceramic, eg cordierite, or manufactured metal through-flow honeycomb substrate. The substrates are generally cylindrical, but may be oval or "racetrack" or a skewed oval, and have an effective continuous outer skin. (If the support or substrate does not have a continuous skin, the present invention may be used if the support or substrate is located within a sleeve.) Such substrates are very well known and are commercially available, and may have from 50 to 1200 cells/sq in. In order to increase the surface area for catalysis, it is commonplace to coat the substrate with a washcoat, comprising a slurry of high surface area particles such as alumina, optionally containing other components such as soluble and/or supported catalytically active platinum group metals ("PGMs"), promoters such as ceria, zirconia, barium etc and other components or absorptive materials such as silica, zeolite etc. In some cases, after the washcoat is applied and dried and/or fired to give an adherent coating, one or more catalyst layers is applied. This may be by impregnation of solutions of one or more PGMs, generally selected from one or more of platinum, palladium and rhodium, and/or soluble promoters and/or by applying more layers of the same or different types of catalytically active or absorptive washcoats. The coating processes in use are usually considered as confidential know-how, but are generally variations on immersing the substrate in the slurry or solution, or passing the substrates through a curtain or waterfall of the slurry or solution and using compressed air to blow the fluid into and through the substrate, ensuring coating of the cells and also ensuring that there are no or practically no blocked cells.

We have realised that such processes are not very flexible and have a number of other disadvantages. The slurry or solution is recycled, but the absorption characteristics of the substrate or washcoated substrate are such that certain components, eg finer particles or certain dissolved platinum group metal salts, deposit preferentially, thus changing the composition of the recycled fluid and accordingly altering some of the characteristics of the subsequently coated catalysts. We have accordingly realised that continuous processes may not provide the best answer for producing catalysts with identical performance and other characteristics. The present invention provides a batch or semi-batch process that offers very significant improvements in producing car catalysts, with advantages in consistency and control of raw materials, as well as offering catalyst design options not previously available for large scale manufacturing. It is believed that the present invention may have particular applicability in the coating of very high cell density substrates which are difficult to coat using conventional technology.

We are aware of some prior proposals which have some of the objectives of the present invention. For example, in U.S. Pat. No. 5,543,181, catalyst solution is sprayed into the cells of a honeycomb support through probes which are inserted into the cells. Such a system is mechanically complex and not capable of coping with very high cell density substrates. U.S. Pat. No. 4,931,419 discloses a method of soaking one end of a monolithic support in a specified volume of liquid, equal to the pore volume of the support and turning the monolithic support over to cause the liquid to drain through the support. Such a method still permits losses of valuable precious metal catalysts. U.S. Pat. No. 5,422,138 teaches a coating apparatus involving dipping the base of a monolithic support into a coating liquid then blowing excess liquid from the cells. WO 97/48500 describes a further catalyst coating system where a substrate is partially immersed in a coating liquid, a vacuum is applied to draw the liquid up into the cells of the substrate to a distance less than the length of the cells. Such a system is not very flexible and still recycles coating liquid.

A further proposal is disclosed in GB 2,012,616, which discloses apparatus and methods for coating catalyst substrates using a measured charge of slurry which is drawn into and through the substrate. It is clear that the charge of slurry is such that it is in excess of that actually required to coat the substrate. It is not believed that this proposal was ever developed to the stage of commercial utility. We believe that the fact that excess slurry is used, which is recycled for re-use, results in the alteration of composition in time as various components of the slurry deposit preferentially onto the walls of the substrate.

The present invention provides a monolithic support coating apparatus, comprising means for dosing a predetermined quantity of a liquid component such quantity being such that it is substantially wholly retained within the intended support, liquid component containment means locatable on the top of a support to receive said quantity of liquid component and pressure means capable of withdrawing the liquid component from the containment means into at least a portion of the support.

The invention further provides a method of coating a monolithic support, comprising the steps (a) locating a containment means on top of a support, (b) dosing a predetermined quantity of a liquid component into said containment means, either in the order (a) then (b) or (b) then (a), and (c) by applying pressure or vacuum, drawing said liquid component into at least a portion of the support, and retaining substantially all of said quantity within the support. The method may, but need not, provide plug flow into the support.

Desirably, no more than 1 wt % of the liquid, more preferably no more than 0.5%, especially none of the liquid, is drawn through the substrate and expelled.

The liquid component may be any liquid used to coat a monolithic support, whether or not it contains catalytic components. In general, this will be a slurry of particles, eg absorber or a washcoat slurry, or a solution of catalytically active components, although for certain advanced design catalysts, a washcoat slurry may contain catalytically active particles or solutions. The actual composition of the liquid component is not important for the present invention.

Part of the present invention is a liquid component containment means which is located on top of a support to be coated. Whilst the design and function of this will be better appreciated from the specific description hereinafter, it should be understood to comprise at least a wall generally corresponding to the cross-sectional shape of the support. It may also comprise a permeable base closing the walls to form a container. The wall may be manufactured from plastics, including polypropylene or preferably PTFE, metal, especially stainless steel or PTFE-coated stainless steel, or ceramic, and the base may be a perforated or porous metal plate, sintered metal sponge, a woven or non-woven fabric or a synthetic open cell foam. In certain embodiments, the base or part thereof may be moveable in the manner of a guillotine, iris or shutter, or a separate permeable base, for example applied to the face of the support, may be used. Combinations of different materials may be used, for example, the foam is useful to distribute the liquid evenly across the face of the support, and hence ensure even coating. For certain coating components, the rheology may be such that the component does not begin to enter the cells of the support until pressure or vacuum is applied, and hence no permeable base is required to contain the liquid component.

The containment means need not, and in certain preferred embodiments is designed not to, contain and hence locate the liquid component over the entire upper surface area of the support. The containment means may be shaped to blank off areas of the support, so that coating is not carried out in those areas. For example, in a car catalyst or absorber which is mounted in a housing in the exhaust, the support is sealed around its edges to prevent gas flow by-passing the support. The effect is to seal off a circumferential quantity of cells; so that these cells are not used for catalysis or absorption/desorption and therefore their content of precious metal catalyst or absorber may be considered to be wasted. The present invention offers the possibility of not coating such circumferential cells. It is also well understood that for a variety of reasons, gas flow is concentrated in the central portion of a monolith, and the present invention permits such a central portion to be coated with a different composition and/or different concentration of components. Accordingly, the containment means may be divided internally to separate different liquids for coating, or parts may be blanked off to prevent coating. It is within the present invention to modify the base of the containment means to achieve a desired coating profile or to yield a desired product. For example, the base may have differing permeability to give easier flow, and hence greater coating deposits, in certain regions, or the base may itself act as a profiled containment means, eg by machining a honeycomb monolith, so that certain regions contain greater quantities of liquid component which are transferred directly to corresponding parts of the support located below the base.

It will be understood that the containment means is desirably provided with sealing means effective to prevent loss of coating liquid when pressure/vacuum is applied. Such sealing may be achieved by using a deformable permeable base, or by a separate seal. One preferred type of seal is an inflatable seal, which may be inflated and deflated under machine control. An inflatable seal permits the apparatus to cater for variations in substrate diameter or circumference. If all the cells of a honeycomb support, or all the area of any other type of support, require to be coated, it is not possible to seal on the top face of the support and accordingly a suitable seal against the outer side of the support enables the coating liquid to access the whole of the support.

It is possible to conceive of the development of accurate dosing means which together with a gel-like liquid component, deposits the coating component onto a support without requiring containment means. This modification of the present invention may be considered as using the structure of the liquid component itself as the containment means and hence is within the scope of the invention.

The liquid dosing means may be engineered using generally known principles. For example, there are commercially available machines capable of highly accurate dosing by volume or weight of liquids, for example used for filling in the food or paint industry. These machines are capable of handling liquids of many different viscosities and rheologies. We believe that the accuracy of dosing using current technology is ±0.1 wt %. This permits a very significant improvement in coating accuracy according to the present invention. It should also be mentioned that the accuracy of the coating process is also dependent upon the accuracy of the liquid (solution or slurry) analysis. However, the invention offers greatly increased opportunities for control of all aspects of coating.

It is desirable to combine the dosing means with automatic handling equipment, which may include a rotatable indexed table capable of moving supports past a number of work stations at which the various stages of the method may take place. Robotic handling may be provided to load and unload supports, and it is envisaged that the method may be used to part-coat the support in the axial direction, then turn the part-coated support and coat the remainder from the other face. It will be appreciated that the basic apparatus is extremely flexible, and can be designed to have easily changeable dosing means and containment means, and a number of different coating functions may be carried out in the same apparatus. Of course, the invention includes essentially manual operation, which may be appropriate for low volume, low labour cost applications.

In a further embodiment of the present invention, the dosing head and containment means are combined into a unitary structure which may be located on top of the support, and either moved into fluid connection with a source of the coating liquid, or is permanently connected thereto, possibly using flexible lines to permit movement of the dosing head and/or the support.

The apparatus and method of the invention may provide plug flow of the dispensed quantity of liquid into the support. An important characteristic of the invention is that substantially all of the liquid is retained within the support, ensuring even distribution in the desired pattern, and ensuring that there is no significant excess liquid requiring recycling. Any small quantities of liquid which are not retained within the support are captured in the preferred embodiments in the vacuum hood as illustrated hereinafter, thus improving the health and safety environment.

Although the invention may operate using air pressure or a combination of air pressure and vacuum to initiate transfer of the liquid from the containment means into the support, we presently prefer to use the application of a vacuum to the bottom of the support, causing normal air pressure to force the liquid into the cells of the support. If necessary, a pulse of air flow may be initiated to clear the cells of the support and prevent blockages. In more advanced embodiments, the vacuum itself may be non-uniformly applied either temporally or spatially.

The quantity of liquid component is pre-determined according to the desired coating design and the behaviour of the liquid component to coat the support without excess, by conventional experimental methods. The liquid is desirably stored in a large volume container which may be stirred and will be replenished from time-to-time. Since the apparatus provides accurately measured volumes and no recycling, the quality or composition of the liquid component remains constant, and losses are reduced.

A particular advantage of the invention in the manufacture of catalysts is that usage of precious metal is very well controlled, and it is not so necessary to over-specify metal loadings in order to cope with process variations.

After coating, the support may be dried, and fired if required, to fix or transform the coating.

The invention will now be described by way of example only with reference to the accompanying drawings, in which FIG. 1 is a schematic cross-section of an apparatus according to the invention, FIG. 2 is a schematic cross-section of two designs of containment means, and FIG. 3 are schematic cross-sections of different product catalysts produced according to the present invention.

Referring to FIG. 1, a liquid dosing head is generally indicated by 1. This may be adapted from a food container filling machine. The dosing head draws pre-determined volumes of liquid from a pre-mixed supply held in a reservoir (not shown). A containment means, 2, consists of an annular wall, 3, having a permeable membrane base, 4. The containment means is locatable on top of a catalyst support unit, 5, which may be an extruded honeycomb monolith. The monolith 5 is located in a depression, 6, in a work table, 7, the depression being closed by an air-permeable base, 8. A vacuum hood, 9, is sealed around the permeable base 8 and is connected to a controlled source of vacuum. The containment means 2 is shown mounted with a further hood, 10, which is optional and may be used to apply pressure to the liquid held in the containment means.

From the figure, it can readily be appreciated that the pre-determined volume of liquid is held above the monolith until vacuum and/or over-pressure is applied, at which time the liquid is drawn into and retained within the cells of the monolith. Plug flow was observed.

Referring to FIG. 2, two head designs are illustrated, particularly suitable for relatively low viscosity liquids such as impregnation solutions. In the drawings, the same identification numbers are used as in FIG. 1. In FIG. 2a, a seal, 11, is shown to contact the upper surface of the monolith, 5. In FIG. 2b, this design is particularly adapted for a metal monolith which has an upstanding lip, 12. The base 4 of the containment means consists of a perforated metal plate, 13, combined with a deformable open cell foam disc, 14. It can be seen that when the containment means is brought down onto the lipped monolith, the foam deforms to provide sealing and a suitable distribution of liquid when liquid flow is initiated.

FIG. 3 illustrates the different catalyst designs that can be produced according to the present invention. Taking the catalysts as generally cylindrical, different concentrations and/or different washcoat and/or catalyst formulations and profiles may be achieved as indicated by different letters A, B and C. It will readily be appreciated that the opportunities for catalyst design to meet specific requirements are greatly increased by the present invention.

Although the above description has concentrated on coating car catalysts, the invention may, as has been mentioned, coat many other similar products, and absorbers are particularly suitable. Indeed, the invention permits an absorbent coating to be applied to the same monolithic support as a catalyst coating.

The skilled person may readily change many of the details described without departing from the inventive concept.

The invention claimed is:

1. A method of coating a monolithic support, comprising the steps of (a) locating a containment means on top of a monolithic support; (b) dosing a pre-determined quantity of a liquid component into the containment means, wherein the order of steps (a) and (b) is (a) then (b) or (b) then (a); and (c) initiating transfer of the liquid component into at least a portion of the monolithic support, and retaining all of the quantity of the liquid component within the monolithic support.

2. A method according to claim 1, wherein the step of initiating transfer of the liquid component comprises applying vacuum to the bottom of the monolithic support.

3. A method according to claim 2, wherein the step of initiating transfer further comprises applying pressure to the liquid component held in the containment means.

4. A method according to claim 3, wherein the monolithic support has cells and the step of applying pressure comprises applying a pulse of air flow to clear the cells of the monolithic support.

5. A method according to claim 1, wherein the step of applying vacuum comprises applying vacuum non-uniformly.

6. A method according to claim 1, wherein the step of applying vacuum comprises applying vacuum non-uniformly temporally.

7. A method according to claim 1, wherein the step of applying vacuum comprises applying vacuum non-uniformly spatially.

8. A method according to claim 1 further comprising the step of capturing the remaining liquid component not retained within the monolithic support in a vacuum hood.

9. A method of coating a monolithic support, comprising the steps of dosing a pre-determined quantity of a liquid component to the top of a monolithic support, wherein the liquid component is gel-like and does not flow until pressure or vacuum is applied and initiating transfer of the liquid component into at least a portion of the monolithic support by applying at least one of pressure to the liquid component or vacuum to the bottom of the monolithic support, and retaining all of the quantity of the liquid component within the monolithic support.

10. A method according to claim 1 further comprising the step of automatically moving the monolithic support to the containment means.

11. A method according to claim 1 further comprising the step of using robotic handling to load and unload supports onto the containment means.

12. A method according to claim 1, wherein the step of dosing comprises identifying the predetermined quantity of the liquid component based on the desired coating and the behavior of the liquid component with respect to the monolithic support.

13. A method according to claim 1 further comprising the step of sealing the containment means to the monolithic support.

14. A method according to claim 13, wherein the step of sealing is done with an inflatable seal and the method further comprises controlling the inflation and deflation of the seal.

15. A method of coating a monolithic support, comprising the steps of (a) locating a containment means on top of a monolithic support; (b) dosing a pre-determined quantity of a liquid component into the containment means for partially coating the monolithic support, wherein the order of steps (a) and (b) is (a) then (b) or (b) then (a); (c) applying vacuum to the bottom of the monolithic support to draw the liquid component into a portion of the monolithic support to form a partially-coated monolithic support; (d) turning the partially-coated support; (e) locating the containment means on the top of the monolithic support; (f) dosing a pre-determined quantity of the liquid component into the containment means for coating the remainder of the monolithic support, wherein the order of steps (e) and (f) is (e) then (f) or (f) then (e); and (g) applying vacuum to the bottom of the monolithic support to draw the liquid component into the remainder of the monolithic support to form a fully-coated monolithic support, and retaining all of the quantity of the liquid component within the monolithic support.

16. A method according to claim 1 further comprising the step of applying a coating having a differing composition and/or differing concentrations of components across the monolithic support.

17. A method according to claim 16, wherein the step of applying a coating having a differing composition and/or differing concentrations of components comprises shaping the containment means to blank off an area of the support whereby coating is not carried to the area.

18. A method according to claim 16, wherein the step of applying a coating having a differing composition and/or differing concentrations of components comprises dividing the containment means internally for separating different liquids for coating.

19. A method according to claim 16, wherein the containment means comprises a base and the step of applying a coating having a differing composition and/or differing concentrations of components comprises providing the base with regions of differing permeability.

20. A method according to claim 1, wherein the liquid component comprises a solution of catalytically active components.

21. A method according to claim 1, wherein the liquid component comprises a washcoat slurry of catalytically active components.

* * * * *